(12) United States Patent
Curran et al.

(10) Patent No.: US 7,072,179 B1
(45) Date of Patent: Jul. 4, 2006

(54) FANLESS COMPUTER WITH INTEGRATED DISPLAY

(75) Inventors: Michael A. Curran, Westerville, OH (US); James Hogan, Gahanna, OH (US); Gary Peck, Westerville, OH (US)

(73) Assignee: Micro Industries Corporation, Westerville, OH (US)

( * ) Notice: Subject to any disclaimer, the term of this patent is extended or adjusted under 35 U.S.C. 154(b) by 0 days.

(21) Appl. No.: 10/937,976

(22) Filed: Sep. 10, 2004

(51) Int. Cl.
*G06F 1/20* (2006.01)

(52) U.S. Cl. .................. 361/687; 361/695; 165/104.32; 62/259.2

(58) Field of Classification Search ........ 361/690–695, 361/679–687, 724–727; 165/122, 126, 104.32; 257/718–719; 174/15.2; 62/259.2
See application file for complete search history.

(56) References Cited

U.S. PATENT DOCUMENTS

| | | | |
|---|---|---|---|
| 4,771,365 A | 9/1988 | Cichocki et al. | |
| 5,243,493 A * | 9/1993 | Jeng et al. | 361/690 |
| 5,683,070 A | 11/1997 | Seed | 248/442.2 |
| 5,729,431 A | 3/1998 | Marwah et al. | |
| 5,742,690 A | 4/1998 | Edgar | 381/24 |
| 5,761,071 A | 6/1998 | Bernstein et al. | |
| 5,769,374 A | 6/1998 | Martin et al. | 248/221.11 |
| 5,781,708 A | 7/1998 | Austin et al. | 395/106 |
| 5,826,267 A | 10/1998 | McMillan | |
| 6,042,007 A | 3/2000 | Nugent et al. | |
| 6,052,279 A | 4/2000 | Friend et al. | 361/686 |
| 6,078,848 A | 6/2000 | Bernstein et al. | |
| 6,081,422 A | 6/2000 | Ganthier et al. | 361/686 |
| 6,086,173 A | 7/2000 | Restell | 312/223.3 |
| 6,181,554 B1 | 1/2001 | Cipolla et al. | |
| 6,241,149 B1 | 6/2001 | Baitz et al. | 235/7 |
| 6,290,517 B1 | 9/2001 | Anderson | 439/131 |
| 6,324,056 B1 | 11/2001 | Breier et al. | |
| 6,336,615 B1 | 1/2002 | Jeon | 248/220.42 |
| 6,442,018 B1 | 8/2002 | Dinkin | |
| 6,502,076 B1 | 12/2002 | Smith | |
| 6,532,152 B1 | 3/2003 | White et al. | 361/692 |
| 6,839,227 B1 | 1/2005 | Correa | 361/683 |
| 6,839,231 B1 * | 1/2005 | Fleck et al. | 361/687 |

(Continued)

OTHER PUBLICATIONS

"MICROSPACE®-PC from Digital-Logic—the smallest and fanless computer for rough environmental conditions," Digital-Logic AG—Press Release, Nov. 2002, http://digitallogic.presseagentur.com/pr-infos/digitallogic/en/PR11-02.htm.

(Continued)

*Primary Examiner*—Hung Van Duong
(74) *Attorney, Agent, or Firm*—Standley Law Group LLP

(57) ABSTRACT

The present invention is a fanless computer with an integrated display. Passive cooling design features, including a heat sink, are incorporated into the device so that it is fanless. The heat sink supports the entire computer enclosure and causes heat in the device to dissipate through vents. The PCB assembly may be attached directly to the heat sink to facilitate thermal transfer characteristics so that components are cooled without the need for a fan. A pressure plate may be attached to the back of the PCB provides a tight coupling between the processor and heat sink. The computer is fanless, silent, and compact and therefore, suitable for many applications, including for use in locations where the availability of space is a concern. For example, the computer may be mounted on a retail store shelf to provide product information to consumers shopping at the retail establishment.

18 Claims, 17 Drawing Sheets

U.S. PATENT DOCUMENTS

| | | | |
|---|---|---|---|
| 2001/0034664 A1 | 10/2001 | Bruson | 705/26 |
| 2003/0048256 A1 | 3/2003 | Salmon | |
| 2003/0115096 A1 | 6/2003 | Reynolds et al. | |
| 2005/0219812 A1* | 10/2005 | Strobel | 361/687 |

OTHER PUBLICATIONS

"MICROSPACE®-PC from Digital-Logic—the smallest and fanless computer for rough environmental conditions," Digital-Logic AG—Press Release, Nov. 2002, http://digitallogic.presseagentur.com/pr-infos/digitallogic/en/PR11-02.htm.

"Hush Debuts Fanless Pentium 4PC, Sleek-looking desktop keeps its cool quietly.," PC World, Sumner Lemon, IDG News Service, Sep. 23, 2003, http://www.pcworld.com/resource/printable/article/9,aid,112608,00.asp.

"Little PC's—Fanless," Stealth Computer Corporation, http://www.stealthcomputer.com/littlepc_fanless.htm.

Copient Technologies, web page, 1 page, dated Mar. 9, 2005, from http://web.archive.org/web/20030724224421/http://www.copienttech.com.

Copient Technologies, Products and Services, web page, 2 pages, dated Mar. 9, 2005, from http://web.archive.org/web/20030806105437/www.copienttech.com/pro...

* cited by examiner

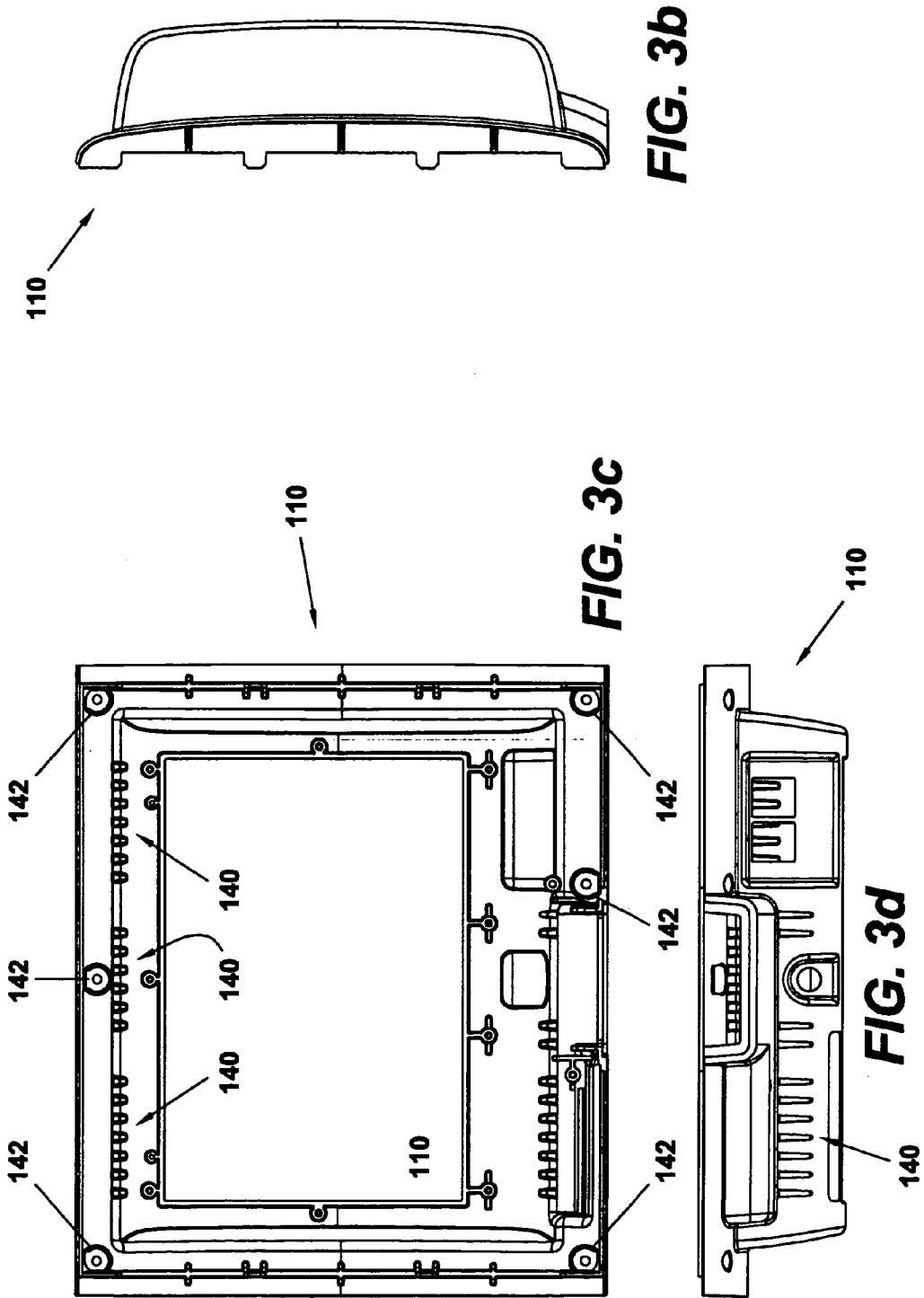

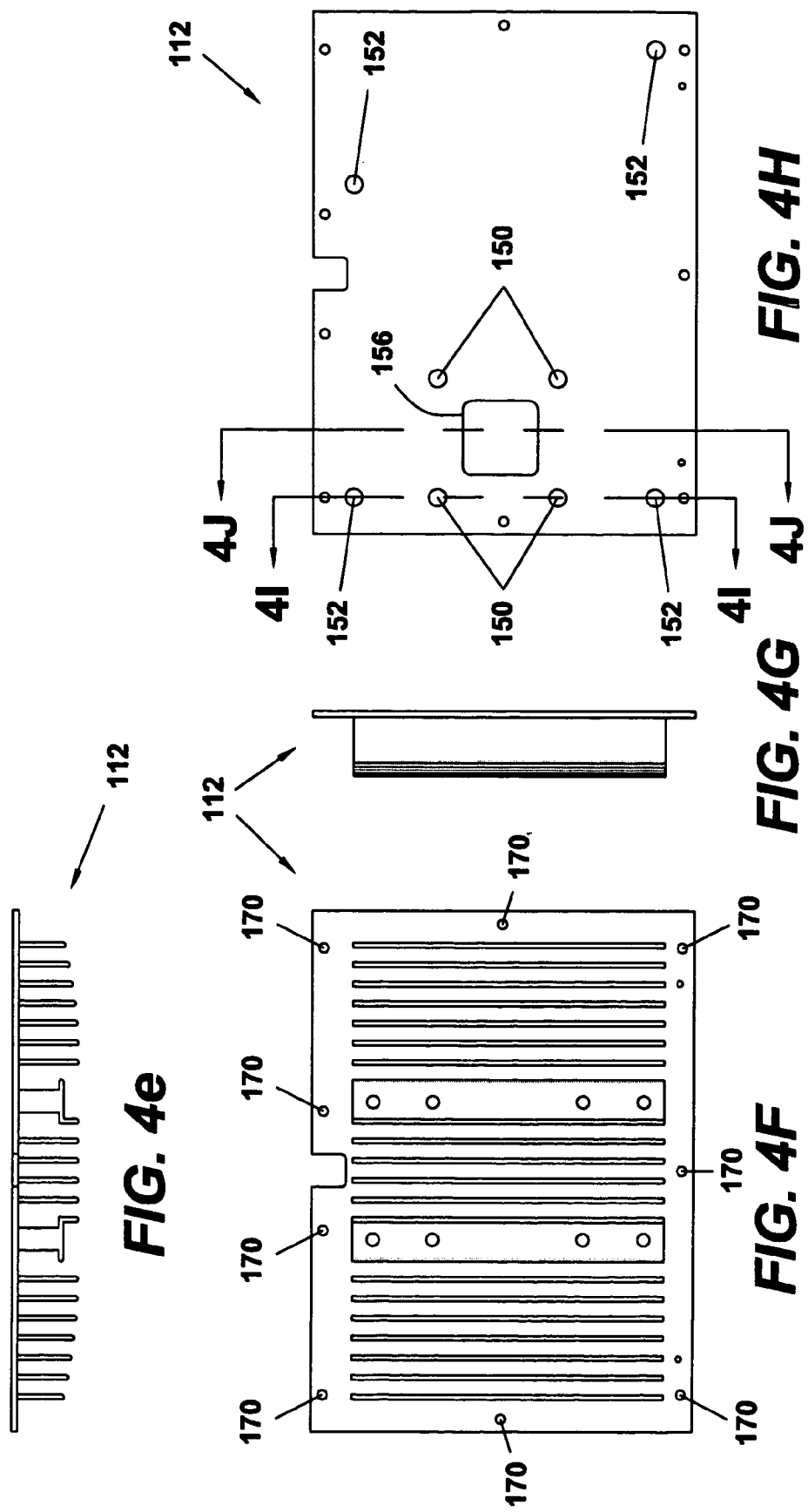

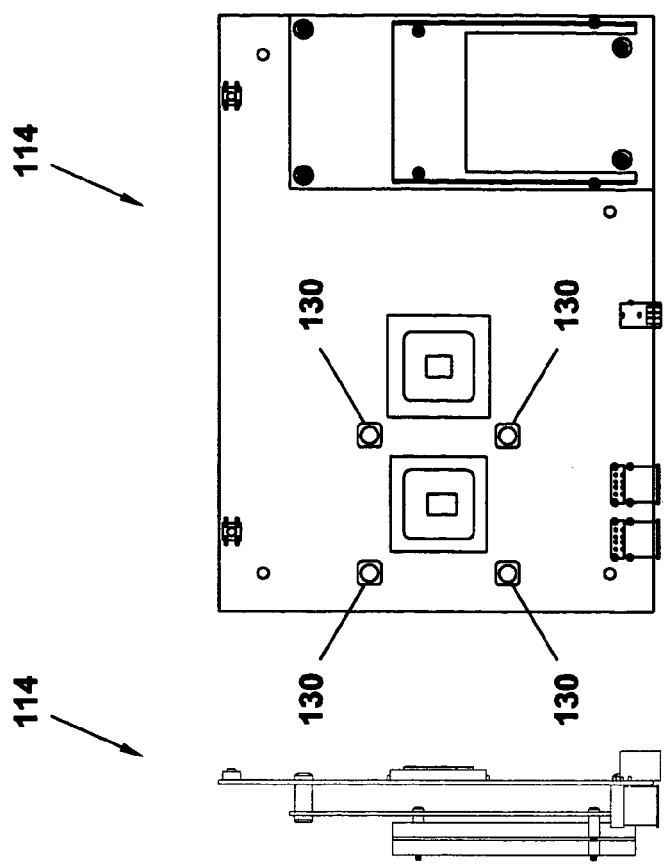
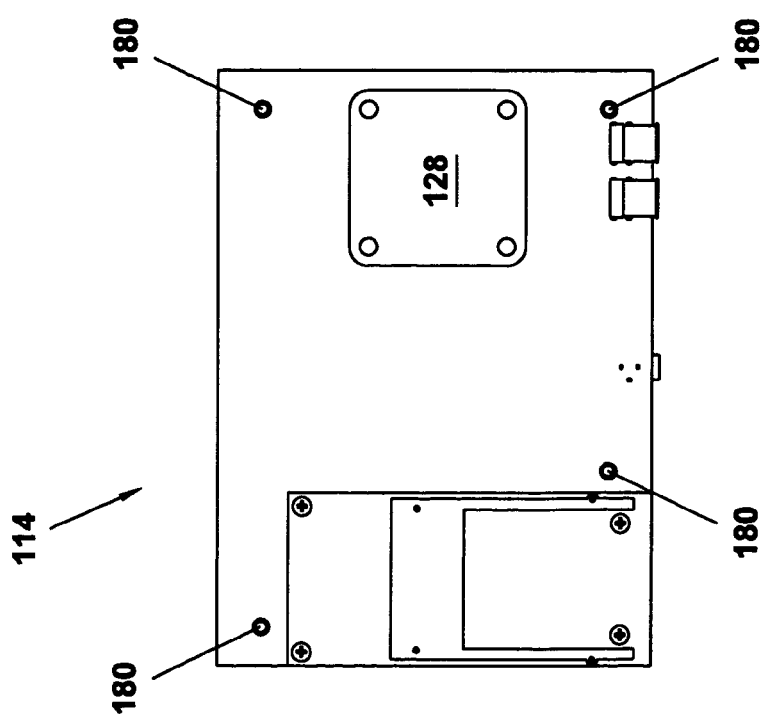
*FIG. 5c*
*FIG. 5b*
*FIG. 5a*

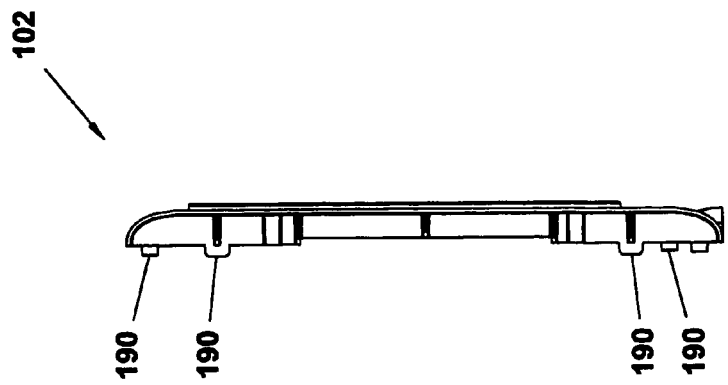
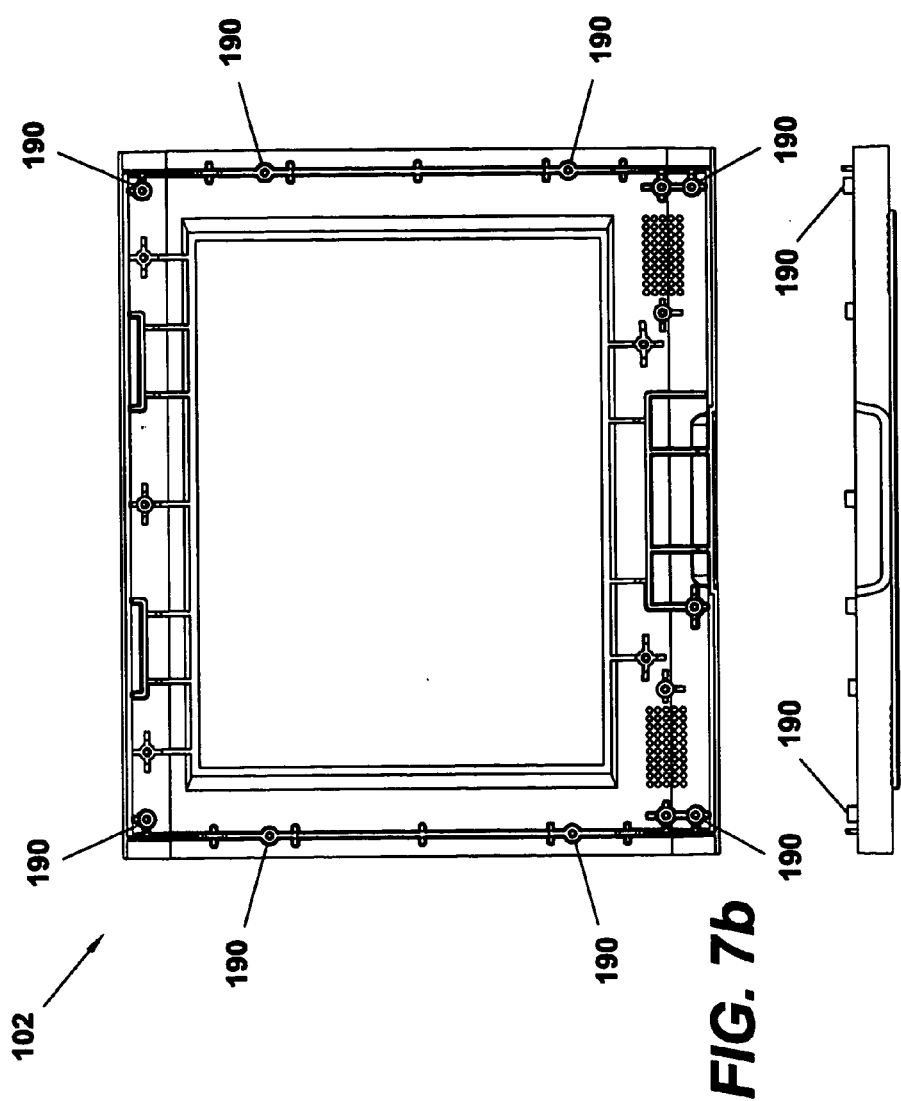

FANLESS COMPUTER WITH INTEGRATED DISPLAY

FIELD OF THE INVENTION

The present invention relates generally to computers with integrated displays. The present invention is a fanless computer with an integrated display.

BACKGROUND OF THE INVENTION

Although computers today are far more powerful and compact than their predecessors, they still contain a number of components that require power and emit a significant amount of heat when operational. Most computers rely on active cooling devices such as fans to control the heat within the computer that intensifies as the computer operates. Typically, the fans are an integral component of the computer. For example, most Pentium®-class computers have two fans. One fan is generally visible from the back of the computer and cools the power supply. The other fan is inside the computer and cools the processor.

Despite the pervasive reliance on cooling fans, they are often the first components of a computer to fail. While a fan is an inexpensive component, the damage that can result to an improperly cooled computer can be very expensive. When excessive heat collects inside the computer, it can damage the CPU, hard disk, motherboard, and other expensive parts of the computer. It is essential, therefore, to try to detect a computer fan failure before the heat causes other failures in the computer.

Fan failures contribute to higher computer maintenance costs in at least two ways. First, maintenance costs are incurred when the failed fans must be repaired or replaced by a technician. Costs are further increased when additional components or the entire computer must be repaired or replaced because the fan failure was not corrected in time to prevent overheating of the other computer components. Costs related to reliability and damage can be significant for businesses that use a large number of computers.

There are other disadvantages to using fans to cool computers. In addition to being costly, computer fans are noisy and they draw dust as they draw air into the computer. The dust can contribute to the fan failures that result in increased maintenance costs. Additional costs may be incurred as attempts are made to control the environment and reduce the level of dust. These disadvantages make actively cooled computers less desirable for applications where noise and dust as well as reliability are a concern such as in hospitals, libraries, schools, etc.

Some computer manufacturers have recognized the advantages of actively cooled computers and have developed passively cooled computers. For example, U.S. Pat. No. 6,324,056 describes a passive cooling device for flat desktop personal computers. U.S. Pat. No. 5,729,431 describes a heat sink also for use in a personal computer. Although passively cooled computers are known, they do not have integrated displays and therefore, are not suitable for many applications in which limited space is available.

SUMMARY OF THE INVENTION

The present invention is a fanless computer with an integrated display. Various passive cooling design features are incorporated into the device so that it is fanless and therefore, silent. It comprises a unique heat sink that supports the entire enclosure and causes heat in the device to dissipate through vents. The motherboard assembly attaches directly to the heat sink to facilitate thermal transfer characteristics so that components are cooled without the need for a fan. The heat sink further serves as the entire supporting structure of the circuit board assembly and is designed and incorporated into the device so that any stress experienced by the heat sink is not transferred to the solder joints. The entire PCB assembly moves with the heat sink.

The benefits provided by the design features of the present invention include increased reliability and lower maintenance costs. The device never suffers from unreliability or damage due to fan failure. The natural convection process results in very light air inflow and almost completely eliminates internal dust build-up. There is no build-up of dust that is normally caused by the use of fans and that often leads to fan failures. As a result, maintenance costs associated with protecting components from fan failures, repairing and replacing fans, and repairing and replacing components damaged by fan failures are eliminated. Because it is fanless, it is also silent. Therefore, it is suitable for many applications including use in hospitals, libraries, or any other location where the presence of noise and dust is a concern. Furthermore, it comprises an integrated display so it is very compact and suitable for use in locations where the availability of space is a concern.

In one application of the present invention, the computer is mounted on a retail store shelf to provide product information to consumers shopping at the retail establishment. With the multitude of products available to today's consumer, and the wealth of information that now commonly exists with respect to such products, it is desirable for retail establishments to provide the consumer with an on-site and efficient means of accessing this additional information. Retailers would like to be able to present the consumer with all, or a large portion of, such information at a single source. For example, when considering a foodstuff, typical information may be related to rebate instructions, the existence of coupons, special pricing, or features. The information may also be more product specific, such as the product's nutritional information, for example. Depending on the particular type of products considered and the level of detail desired, the amount of information that may be provided can be substantial.

The ability to access the information from a computer located in close proximity to the products, where the products may be viewed and touched, is very desirable. To that end, the computer may be mounted to a retail store shelf using a specially design bracket adapted to hold a computer of the present invention. One such bracket that is especially well-suited for this purpose is described in U.S. patent application Ser. No. 10/938,104, entitled ADJUSTABLE BRACKET ASSEMBLY FOR SHELF-MOUNTED ELECTRONIC DISPLAY DEVICE. When mounted to a retail store shelf, the electronic display may provide information via the touch screen to allow a customer to access additional information regarding products appearing on the shelf. Therefore, the amount of information that may be provided via the computer display is virtually endless.

BRIEF DESCRIPTION OF THE DRAWINGS

FIGS. 3a–3d are rear bezel diagrams for an example embodiment of a fanless computer with an integrated display according to the present invention;

FIGS. 4a–4j are a heat sink according to an example embodiment of the present invention;

FIGS. 5a–5c are PCB assembly diagrams according to an example embodiment of the present invention;

FIGS. 7a–7d are perspective views of a front bezel according to an example embodiment of the present invention.

DESCRIPTION OF EXAMPLE EMBODIMENTS

Figure 1A:
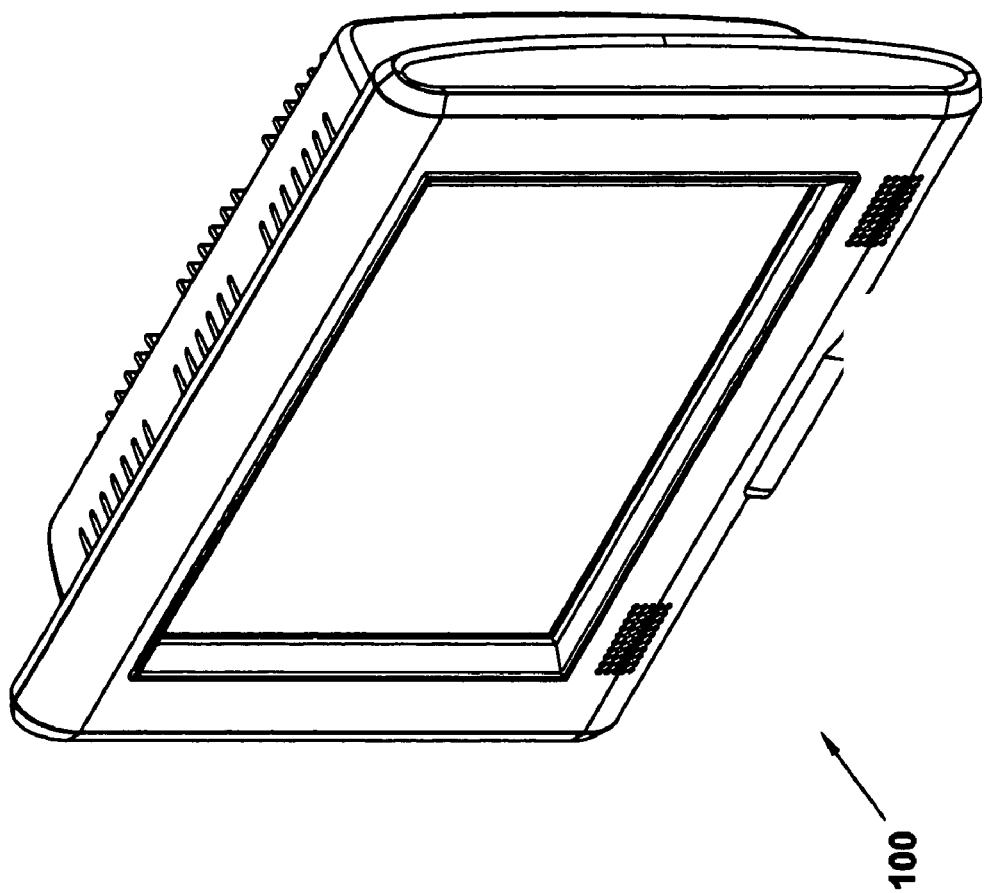
FIGS. 1a–1b are a fanless computer with an integrated touch screen display according to an example embodiment of the present invention.
Figure 1B:
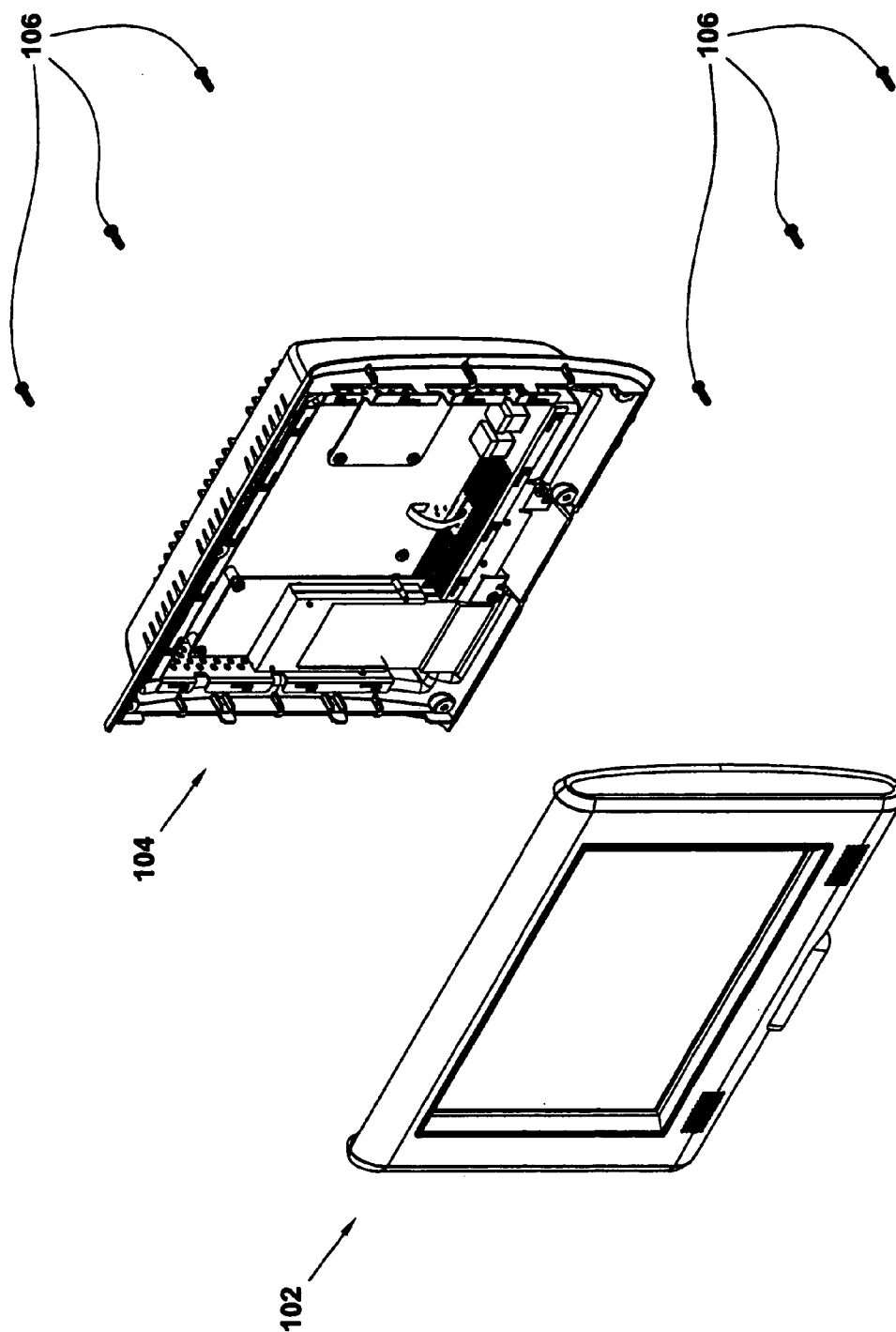

Referring to FIGS. 1a and 1b, an example embodiment of a fanless computer with an integrated touch screen display according to the present invention is shown. The computer 100 of FIG. 1a comprises a front component 102 and a rear component 104 as shown in FIG. 1b. The rear component 104 may be joined to the front component 102 using thread forming fasteners 106 such as PLASTITE® thread-rolling screws.

Figure 2:
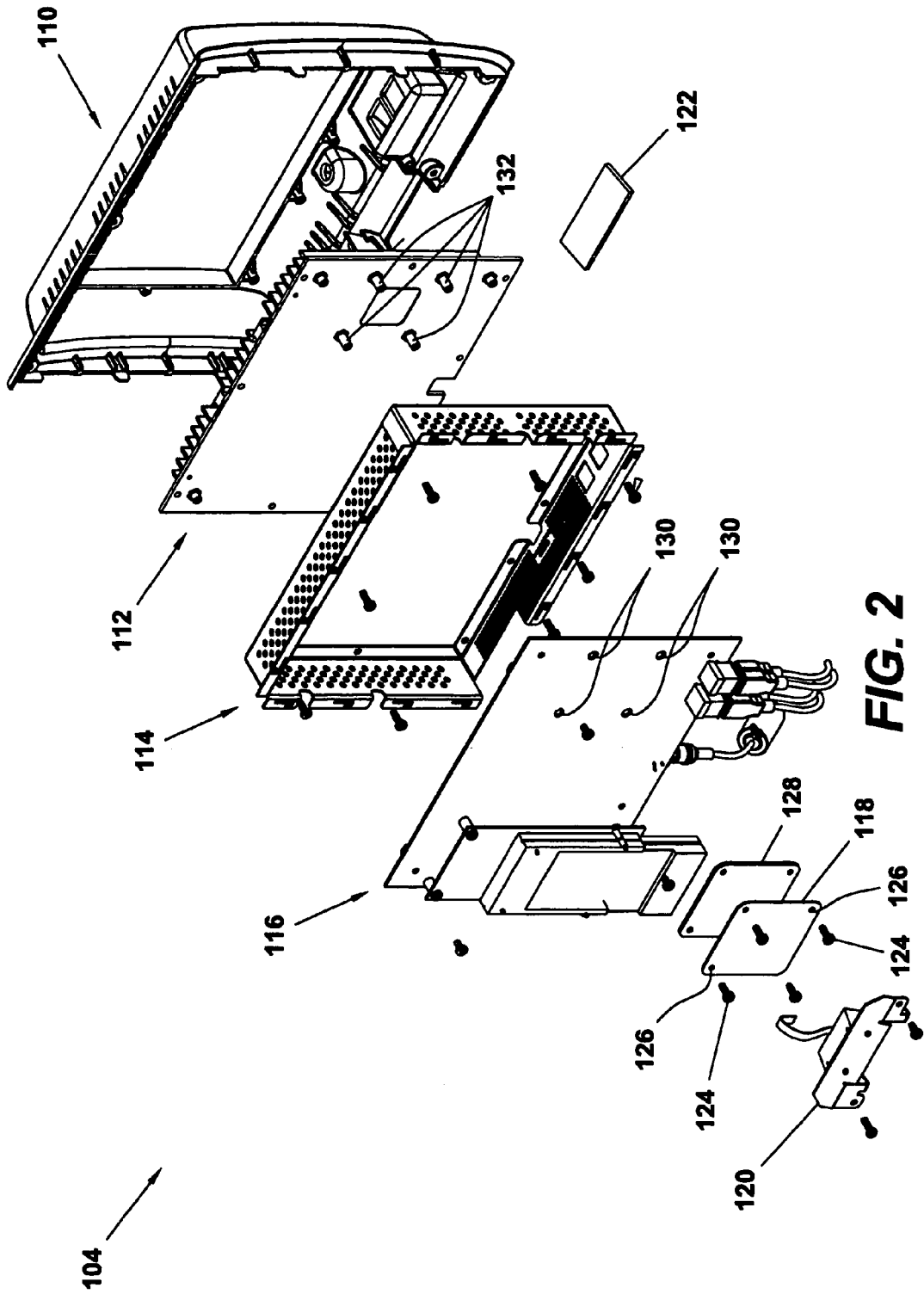
FIG. 2 is a rear component assembly diagram for an example embodiment of a fanless computer with an integrated display according to the present invention.

Referring to FIG. 2, a rear component assembly diagram for an example embodiment of a fanless computer with an integrated display according to the present invention is shown. The rear component 104 may comprise a rear bezel 110, a heat sink 112 (which is unique to the present invention), an EMI box 114, a PCB 116, an optional CPU pressure plate 118, an optional scan assembly 120, and an optional window, scan 122. Thread forming fasteners 124 are inserted through holes 126 on the pressure plate 118, through holes on the PCB 130, and into standoffs 132 on the heat sink 112.

When attached to the heat sink 112, the pressure plate 118 causes the processor on the PCB to press against the heat sink 112 so that heat from the processor may be dissipated through the heat sink 112. A thermal pad (e.g., a resilient and compressible hard rubber pad) 128 is placed between the pressure plate 118 and the PCB 116 so that pressure from the plate 118 is applied evenly to the processor and to ensure the processor is properly seeded with respect to the heat sink 112. The back plate of the PCB 116 may have a dimple pressed into it to create a spring effect that applies pressure to the PCB 116 directly under the processor so that the thermal pad 128 is adequately compressed. In an example embodiment of the present invention, the pressure plate 118 and thermal pad 128 are the same size as the processor on the PCB 116.

Figure 3A:
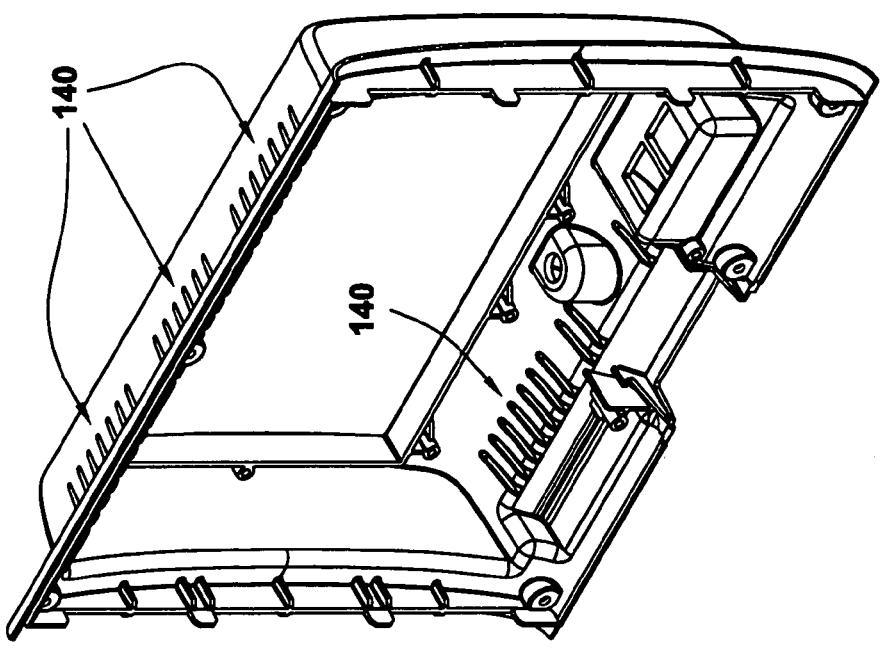

Referring to FIGS. 3a–3d, rear bezel diagrams for an example embodiment of a fanless computer with an integrated display according to the present invention are shown. FIG. 3a is perspective view of the rear bezel of the present invention. FIG. 3b is side view of the rear bezel of the present invention. FIG. 3c is an elevational view of the rear bezel of the present invention. FIG. 3d is bottom view of the rear bezel of the present invention. The rear bezel accommodates the heat sink as well as EMI box and PCB. As shown in FIGS. 3a and 3d, it comprises a plurality of vents 140 so that heat dissipated by the heat sink may flow out of the computer through the vents. As shown in FIG. 3c, a plurality of connection points 142 accommodate components that are attached directly to the rear bezel.

Referring to FIGS. 4a–4j, a heat sink according to an example embodiment of the present invention is shown. In an example embodiment of the present invention, the heat sink is an aluminum extrusion that provides the main support for the entire computer. Components on the PCB assembly may be arranged so that the entire board assembly may be mounted to and supported by the heat sink. When the heat sink is attached to the PCB assembly, dimensions are such that the attachment points may be made on the heat sink and PCB assembly in order to keep the components tightly coupled. The tight coupling facilitates the thermal transfer characteristics so that the entire computer is kept cool but it does so without any significant mechanical stress applied to the PCB assembly or its components.

The major heat producers in the device are integrated circuits which have very little mass and are held fixed in the assembly by the fact that they are soldered to the PCB assembly. The heat sink, relatively speaking, has a lot of mass. Heat transfer may be increased by securely fastening the heat sink to the integrated circuits. However, a heat sink that is large and heavy may put mechanical stress on the integrated circuit solder joints when it is fastened to the integrated circuit. A heat sink that serves as the supporting structure of the entire circuit board assembly therefore allows precise control of the critical dimensions of the heat sink in relationship to the integrated circuits assuring that there is no stress on the solder joints. This design also assures that any stress experienced by the heat sink does not transfer to the solder joints because the entire PCB assembly moves with the heat sink.

The heat sink may further accommodate an exterior bracket for shelf mounting. Forces applied to the enclosure, the mounting bracket, or the touch screen are absorbed by the heat sink and are not transferred to the PCB or its components. To further increase support, the PCB assembly, as well as the rear bezel, is attached to the heat sink. The support and mounting features of the present invention make it especially well-suited for retail applications. The computer may be securely mounted to a retail store shelf so that consumers may interact with the touch screen display to access information about products located on the store shelves.

Figure 4A:
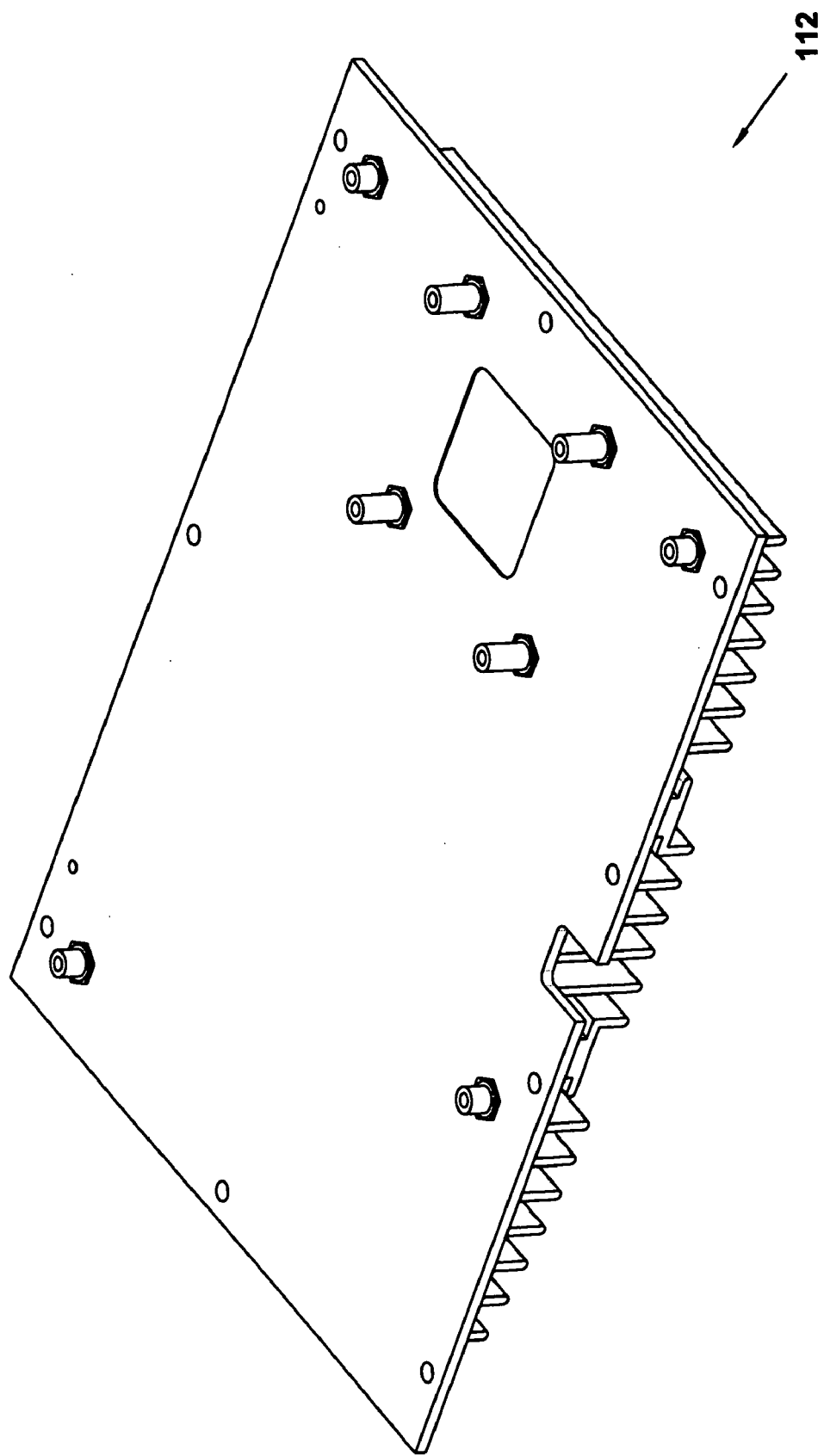
Figure 4B:
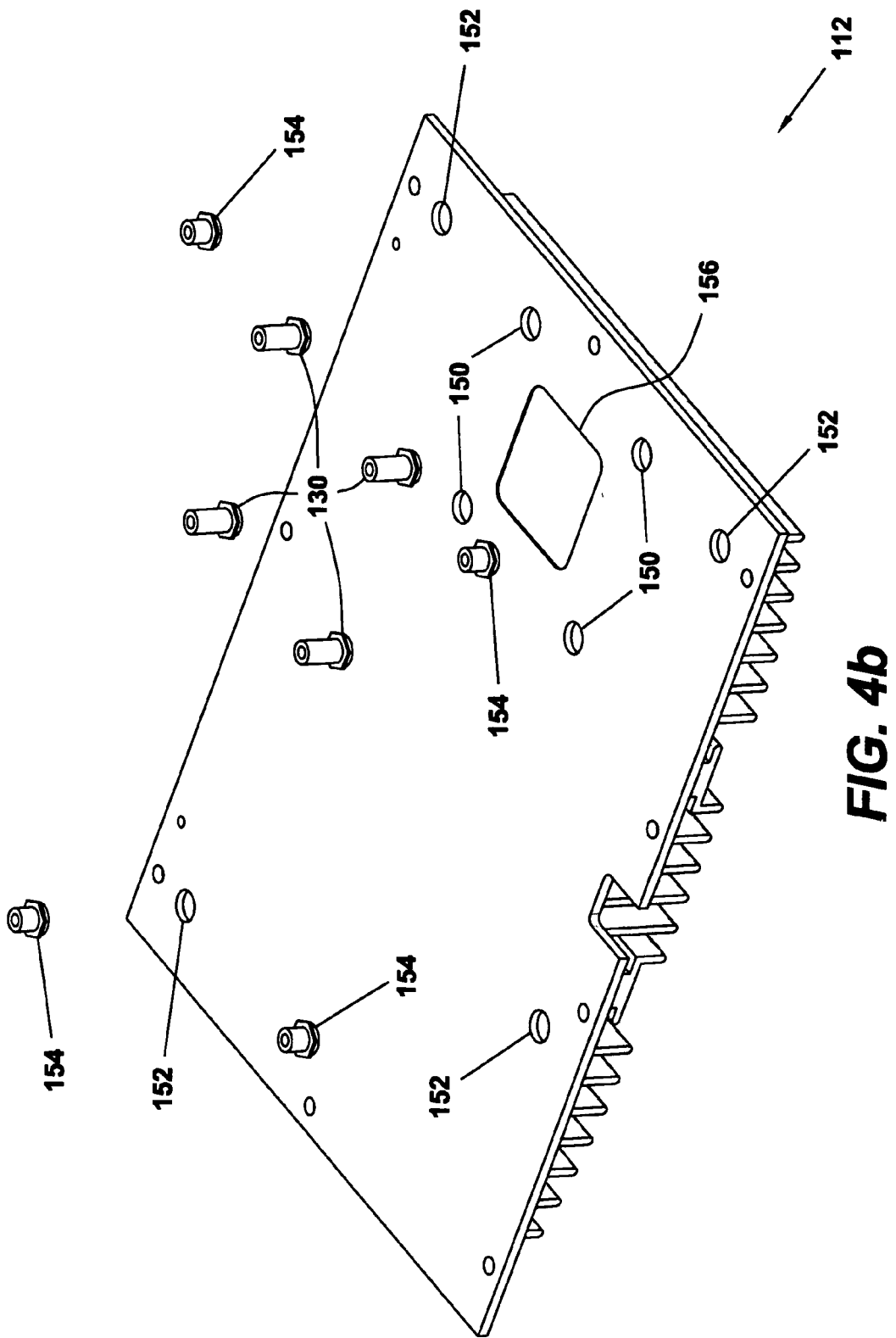

Referring to FIGS. 4a and 4b, rear perspective views of a heat sink according to an example embodiment of the present invention are shown. As shown in FIG. 4b, the heat sink comprises a plurality of holes 152 to accommodate standoffs 154 that may be used to attach the heat sink to the PCB. The heat sink further comprises an indentation 156 which dissipates heat from the processor. Holes 150 surrounding the indentation 156 accommodate thread forming fasteners 130 which are used to hold the pressure plate that is attached to the back of the PCB. The PCB and heat sink may be attached in a plurality of locations so that they are tightly coupled. The tight coupling facilitates the thermal transfer characteristics.

Figure 4C:
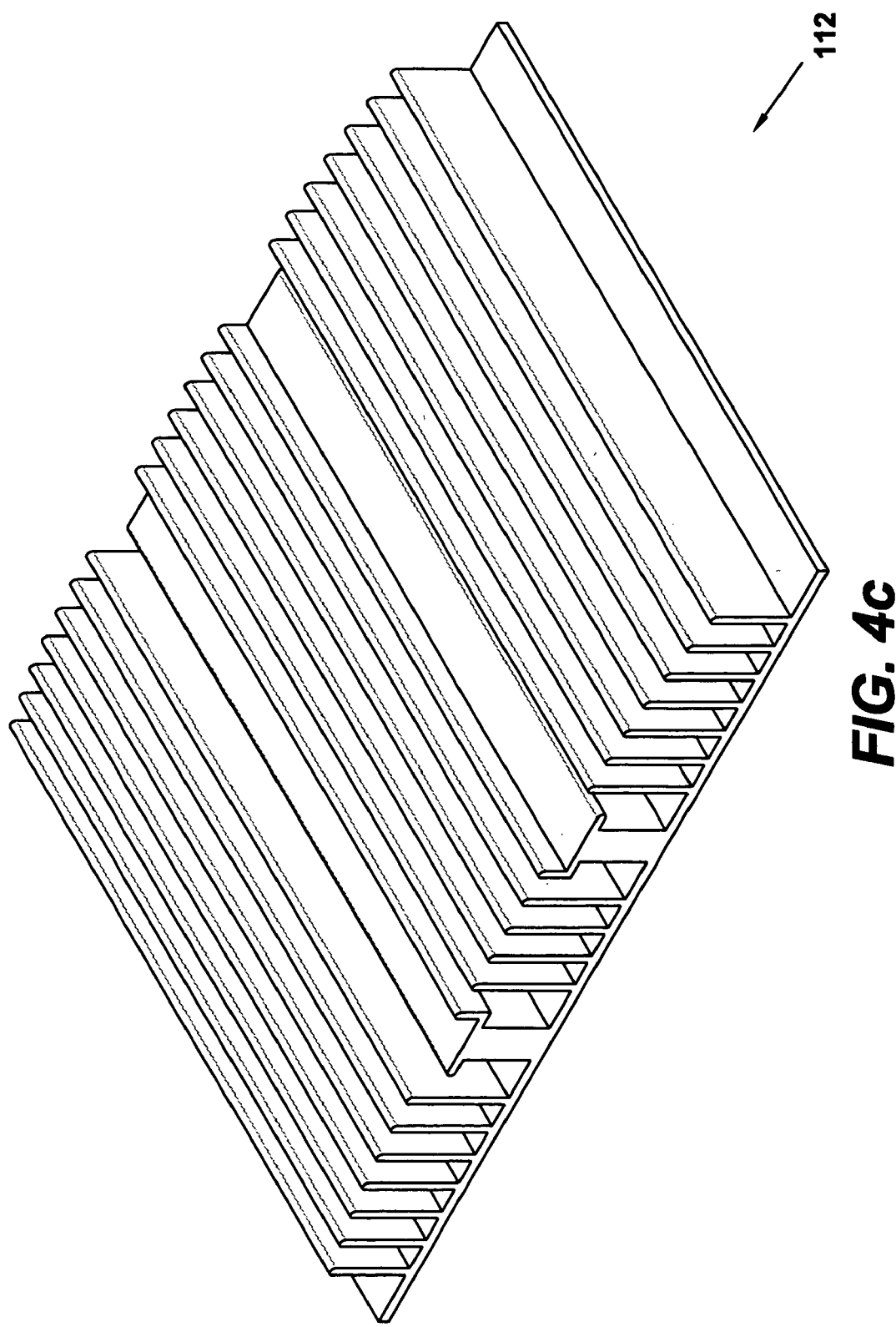
Figure 4D:
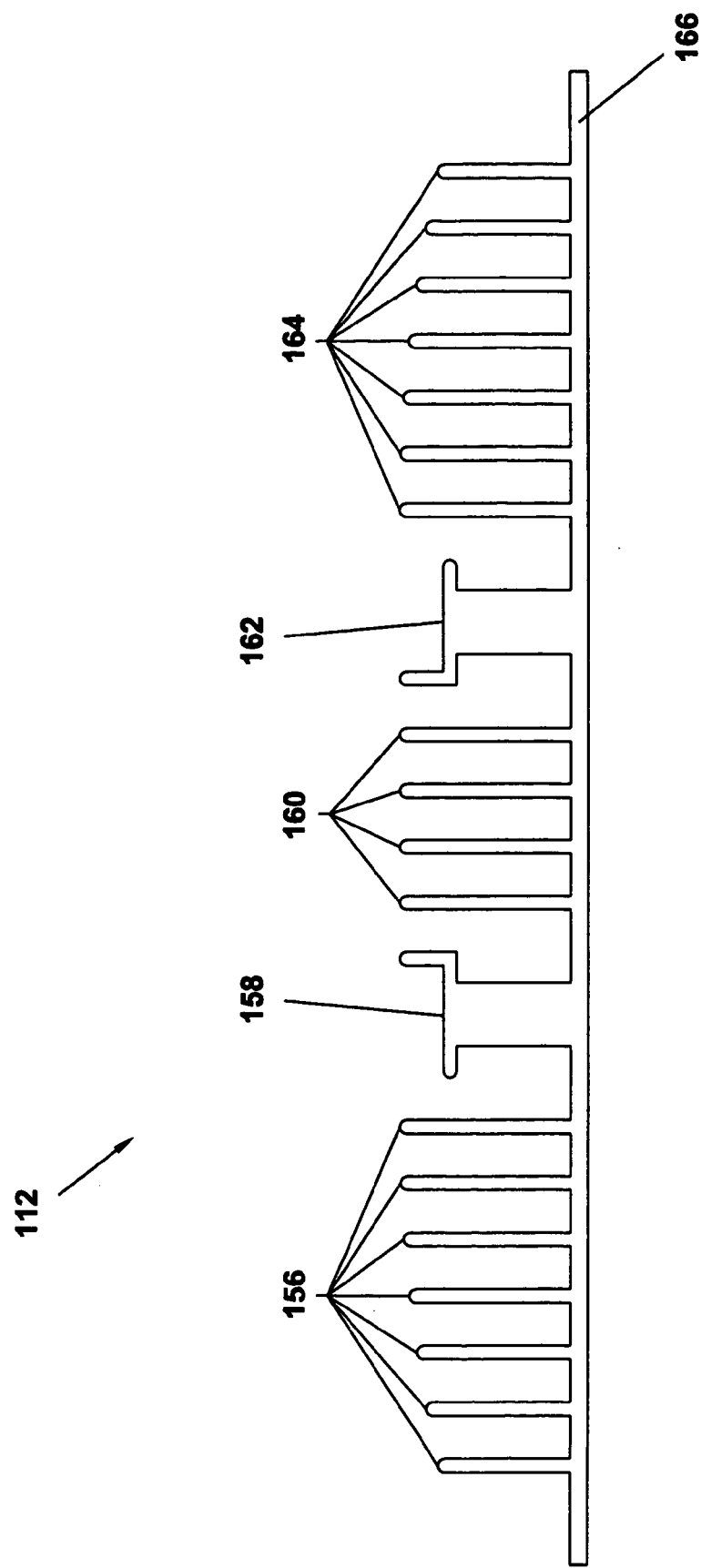

Referring to FIGS. 4c and 4d, front perspective views of a heat sink according to an example embodiment of the present invention are shown. As shown in FIG. 4d, the heat sink comprises a flat portion 166 and a plurality of channels that are formed by a series of parallel partitions 156, 160, 164. The heat sink may further comprise two or more partitions 158, 162 that are wider than the other partitions and that are elevated with respect to the flat portion 166.

Figure 4J:
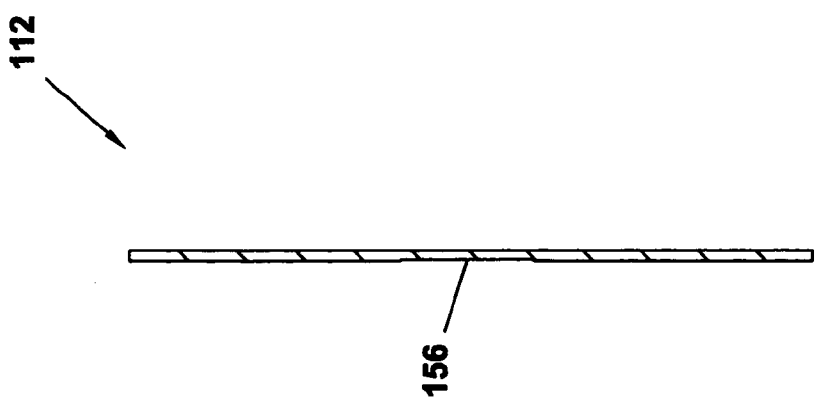
Figure 4I:
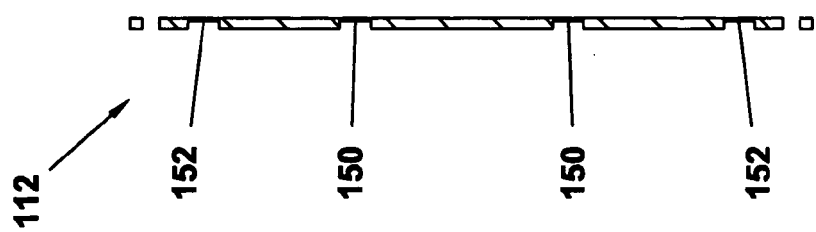

Referring to FIG. 4e, another front perspective view of a heat sink 112 according to the present invention is shown. Referring to FIGS. 4f to 4j, front, side, and rear elevations of a heat sink 112 according to an example embodiment of the present invention are shown. Referring to FIG. 4F, a plurality of holes 170 around the heat sink 112 are used to attach the rear bezel to the heat sink 112. Referring to FIG. 4g, a side view of the heat sink 112 is shown. Referring to FIG. 4h, a rear perspective view of a heat sink 112 according to the present invention is shown. The heat sink 112 comprises an indentation 156 for accommodating the processor on the PCB assembly. The pressure plate is attached at connection points 150. Additional connection points 152 allow the PCB assembly to be tightly coupled to the heat sink 112. Enlarged cross-sectional views of the heat sink are shown in FIGS. 4i and 4i. FIG. 4i is a cross-sectional view of connection points 150 and 152. FIG. 4j is a cross-sectional view of the indentation 156 that accommodates the processor. The heat sink indentation is shown at 156.

Referring to FIGS. 5a–5c, a PCB assembly according to an example embodiment of the present invention is shown. Referring to FIG. 5a, a rear elevation of a PCB according to an example embodiment of the present invention is shown. The heat sources on the PCB include the processor and the chipset. The PCB may further comprise a plurality of connection points 180 for attaching the PCB to the heat sink. FIG. 5a further illustrates the placement of the thermal pad 128 between the CPU pressure plate and PCB assembly 114 that is used to seed the processor to the heat sink. FIG. 5b is a side view of the PCB assembly with the pressure plate attached. FIG. 5c is a front elevation of a PCB according the present invention which illustrates the placement of the holes 128 that accommodate standoffs for attaching the pressure plate to the heat sink.

Figure 6D:
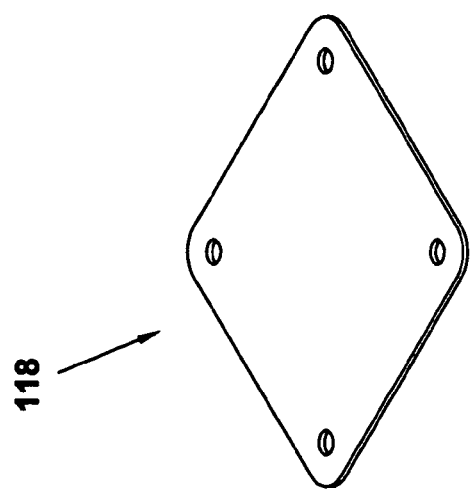
FIGS. 6a–6d are perspective views of a pressure plate according to an example embodiment of the present invention.
Figure 6C:
Figure 6A:
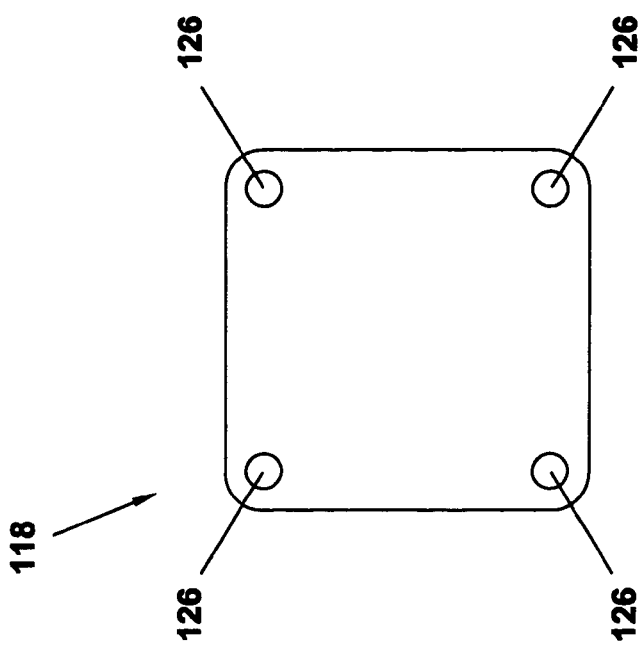
Figure 6B:
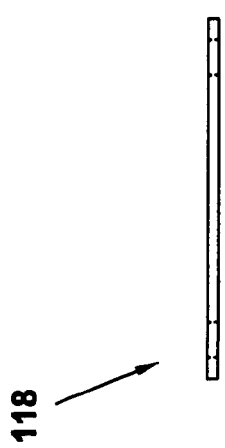

Referring to FIGS. 6a–6d, perspective views of a pressure plate according to an example embodiment of the present invention is shown. Referring to FIG. 6a, the pressure plate 118 comprises a plurality of holes 126 for attaching the pressure plate through the PCB and to the heat sink. FIG. 6b is side elevation of the pressure plate. FIG. 6c is cross-sectional view of the pressure plate. FIG. 6d is a perspective view of the pressure plate 118 illustrating the thickness of the plate.

Figure 7A:
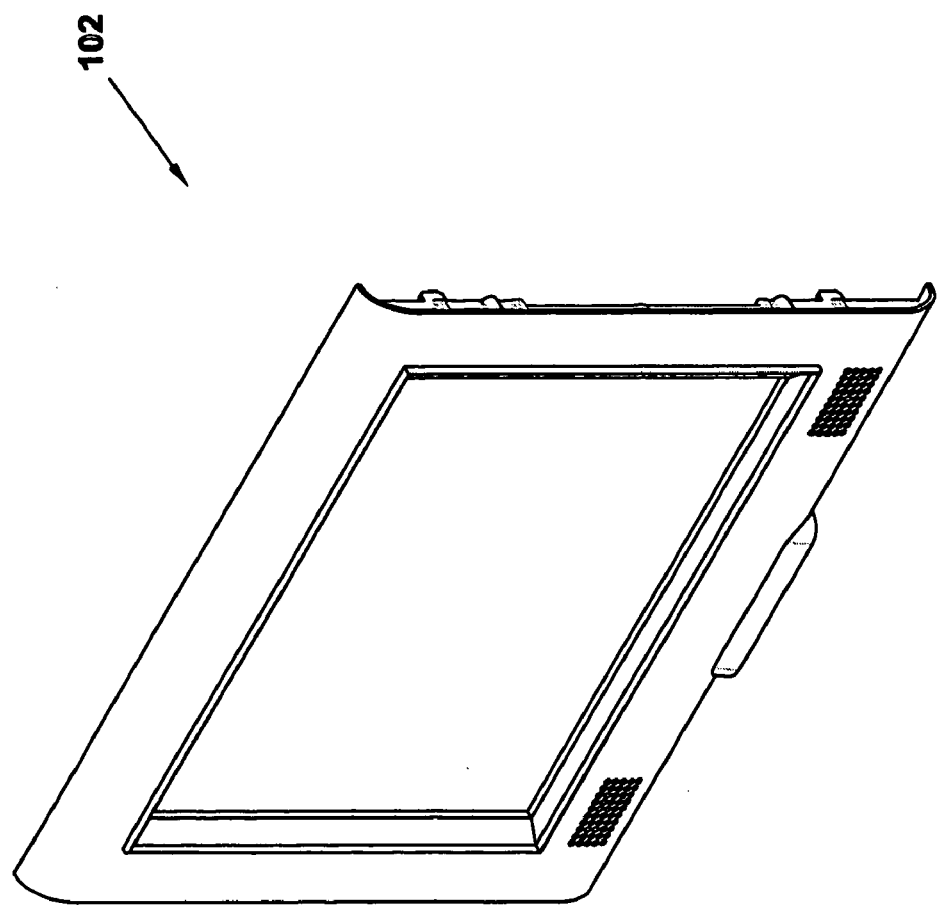

Referring to FIGS. 7a–7d, perspective views of a front bezel according to an example embodiment of the present invention is shown. FIG. 7a is a front perspective view of a front bezel according to an example embodiment of the present invention. FIG. 7b is rear perspective view of a front bezel according to an example embodiment of the present invention. The front bezel comprises a plurality of attachment points 190 for attaching the front bezel to the rear bezel to form the computer. FIGS. 7c and 7d, respectively, are side and top perspective views of a front bezel according to an example embodiment of the present invention.

Figure 8A:
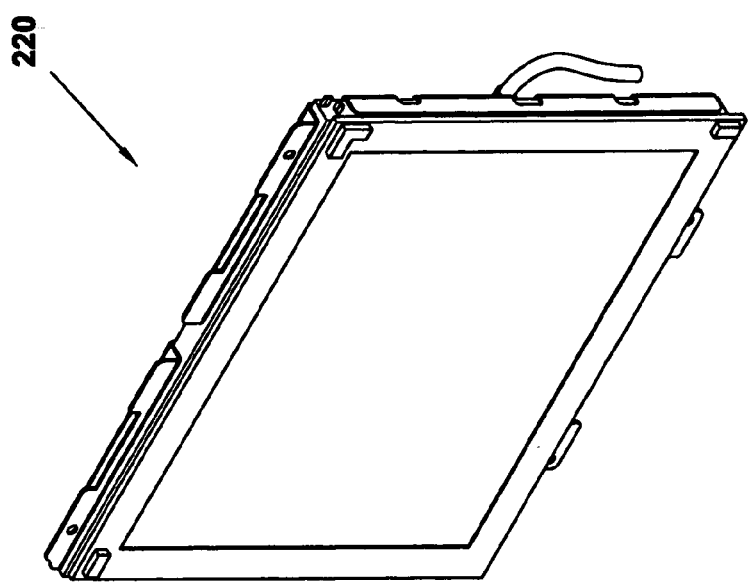
FIGS. 8a–8b are touch screen display assembly diagrams according to an example embodiment of the present invention.
Figure 8B:
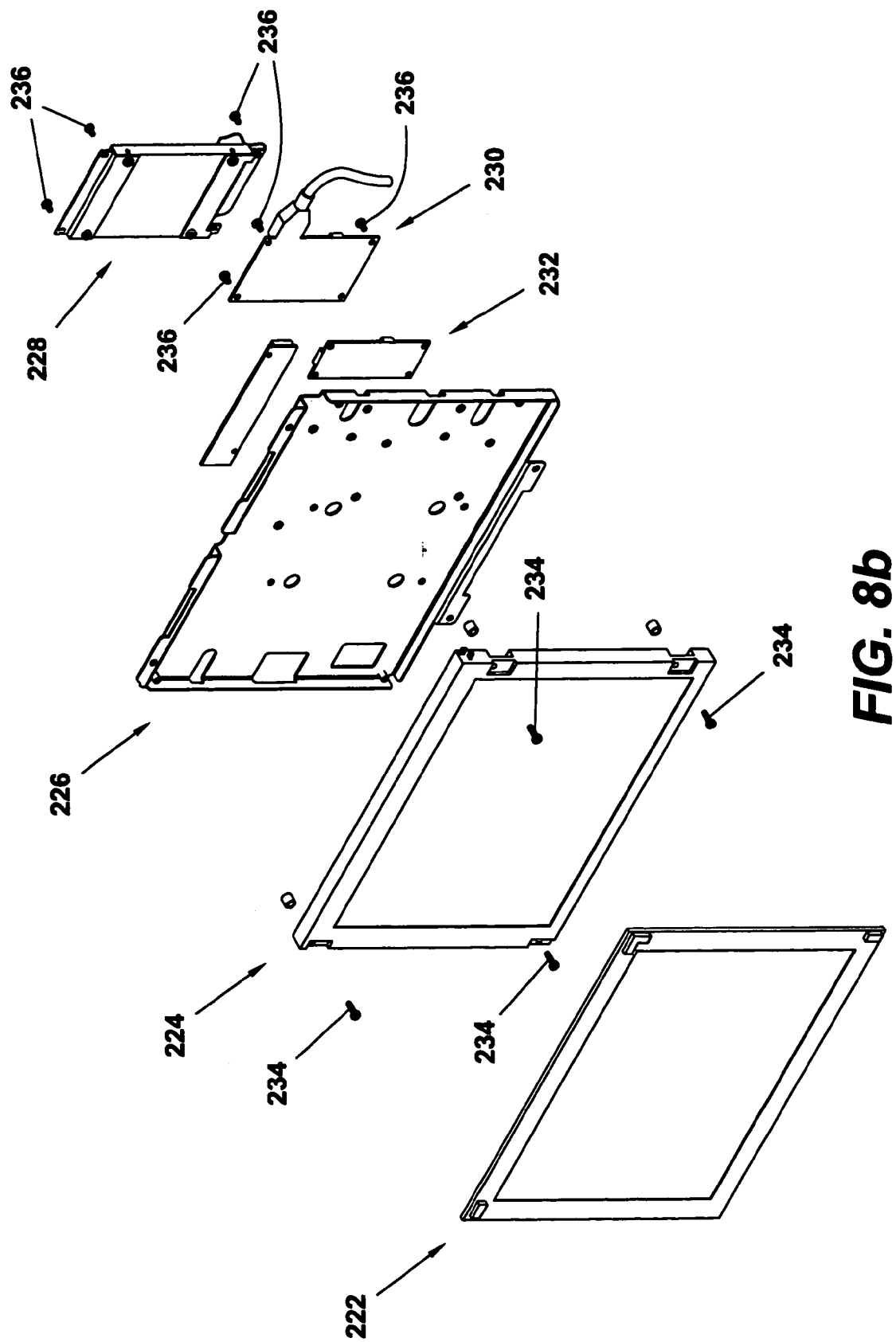

Referring to FIGS. 8a and 8b, a touch screen display assembly according to an example embodiment of the present invention is shown. FIG. 8a is perspective view of an assembled touch screen display 220 according to an example embodiment of the present invention. Referring to FIG. 8b, the touch screen display assembly comprises a touch screen 222, a high resolution display 224, a display bracket 226, a hard drive 228, an inverter board 230, and a touch screen board 232. Standoffs 236 and fasteners 234 are used to attach the components of the touch screen display to form a complete unit. The front bezel and touch screen display assembly of the present invention comprise the front component assembly of the present invention.

The fanless computer of the present invention is suitable for many applications including for use on shelves in retail establishments to display product information to consumers shopping at the establishment. It is a fully functional computer with an integrated display so the type of information that may be displayed to consumers is virtually unlimited. It comprises a touch screen so that consumers may interact with the computer to select and view the information that is of interest to them. Because it contains a unique heat sink to cool internal components passively, it is compact, silent, and very reliable.

While example embodiments of the invention have been illustrated and described, various modifications and combinations can be made without departing from the spirit and scope of the invention. For example, various modifications to the heat sink and pressure plate of the present invention may be made and still fall within the scope of the present invention. Modifications, combinations, and equivalents to the system and method of the present invention are intended to be covered and claimed.

What is claimed is:

1. A fanless computer comprising:
   a front component assembly comprising a front bezel and a touch screen;
   a rear component assembly comprising a rear bezel, an EMI box, and a PCB assembly, said rear bezel comprising vents for dissipating heat; and
   a heat sink comprising an indentation to accommodate a processor on said PCB assembly, a plurality of attachment points for directly attaching said PCB assembly to said heat sink, and a plurality of channels for dissipating heat, said heat sink for dissipating through said channels and through said vents of said rear bezel heat caused by heat sources in said front and rear component assemblies and for supporting said PCB assembly.

2. The fanless computer of claim 1 wherein said heat sink is an aluminum extrusion.

3. The fanless computer of claim 1 wherein said channels for dissipating heat are formed by a series of parallel partitions.

4. The fanless computer of claim 1 wherein said heat sink comprises a plurality of holes for accommodating standoffs to attach said heat sink directly to said PCB assembly.

5. The fanless computer of claim 1 wherein said heat sink is further attached to said rear bezel.

6. The fanless computer of claim 1 further comprising a pressure plate attached to the back of said PCB assembly and to said heat sink.

7. The fanless computer of claim 6 further comprising a thermal pad between said pressure plate and the back of said PCB assembly for seeding said processor on said PCB assembly to said heat sink.

8. The fanless computer of claim 7 wherein said thermal pad is a compressible hard rubber pad.

9. The fanless computer of claim 8 wherein said pressure plate and thermal pad are the same size as said processor on said PCB assembly.

10. A heat sink for use in a computer with an integrated display, said heat sink comprising:
   a plurality of channels formed by a series of parallel partitions;
   an indentation for accommodating a processor on a PCB assembly, said processor and a plurality of components arranged on said PCB assembly in a manner that allows said PCB assembly to be tightly coupled to said heat sink; and
   a plurality of holes for accommodating standoffs to attach said heat sink directly to said PCB assembly in said computer, wherein said heat sink transfers heat from said PCB assembly through said plurality of channels to vents on a rear bezel and supports said PCB assembly.

11. The heat sink of claim 10 wherein said heat sink is an aluminum extrusion.

12. The heat sink of claim 10 further comprising a plurality of holes for attaching said heat sink to a rear bezel of said computer.

13. The heat sink of claim 10 further comprising a plurality of connection points for accommodating a pressure plate attached to the back of said PCB assembly in said computer.

14. A method for constructing a fanless computer comprising:
   constructing a front component assembly comprising a front bezel and a touch screen;
   constructing rear component assembly comprising a rear bezel, an EMI box, and a PCB assembly, said rear bezel comprising vents for dissipating heat; and
   attaching a heat sink with an indentation to accommodate said PCB assembly, said heat sink attached said PCB assembly using attachment points on said heat sink to dissipate heat from PCB assembly through said vents in said rear bezel; and
   connecting said front component assembly and said rear component assembly.

15. The method of claim 14 wherein said heat sink is an aluminum extrusion.

16. The method of claim 14 wherein said heat sink comprises a plurality of channels formed by a series of parallel partitions.

17. The method of claim 14 further comprising attaching a pressure plate to the back of said PCB assembly and to said heat sink.

18. The method of claim 14 further comprising inserting a thermal pad between said pressure plate and the back of said PCB assembly for seeding a processor on said PCB assembly to said heat sink.

* * * * *

UNITED STATES PATENT AND TRADEMARK OFFICE
CERTIFICATE OF CORRECTION

PATENT NO. : 7,072,179 B1  Page 1 of 1
APPLICATION NO. : 10/937976
DATED : July 4, 2006
INVENTOR(S) : Michael A. Curran et al.

It is certified that error appears in the above-identified patent and that said Letters Patent is hereby corrected as shown below:

Item (56), on Title Page please add – OTHER PUBLICATIONS
-- "Management Software for Interactive Terminals – Kiosks – Media Displays," Kudos – Products, 2 pages from website, http://www.kudosdigital.com/products.

TouchPoint Solutions, Inc. – Catapult Software, Catapult$^{TM}$, 2 pages from website, http://www.touchpointsolutions.com/site/technology/discover_catapult.html --

Item (57), on Title Page line 9 of the ABSTRACT
Please delete "be attached to the back of the PCB provides a tight coupling" and insert -- be attached to the back of the PCB which provides a tight coupling --.

Column 5, line 1, please delete "4F" and insert -- 4f --.

Column 5, line 12, please delete "4i and 4i" and insert -- 4i and 4j --.

Column 5, line 27, please delete "attached. FIG. 5c is the front elevation of a PCB according the" and insert -- attached. FIG. 5c is a front elevation of a PCB according to the --.

Column 7, line 21, please delete "said PCB assembly, said heat sink attached said PCB" and insert -- said PCB assembly, said heat sink attached directly to said PCB --.

Signed and Sealed this

Tenth Day of October, 2006

JON W. DUDAS
*Director of the United States Patent and Trademark Office*